A. KRASA.
TRANSMISSION FOR SEWING MACHINES AND THE LIKE.
APPLICATION FILED AUG. 18, 1913.
1,224,473.
Patented May 1, 1917.
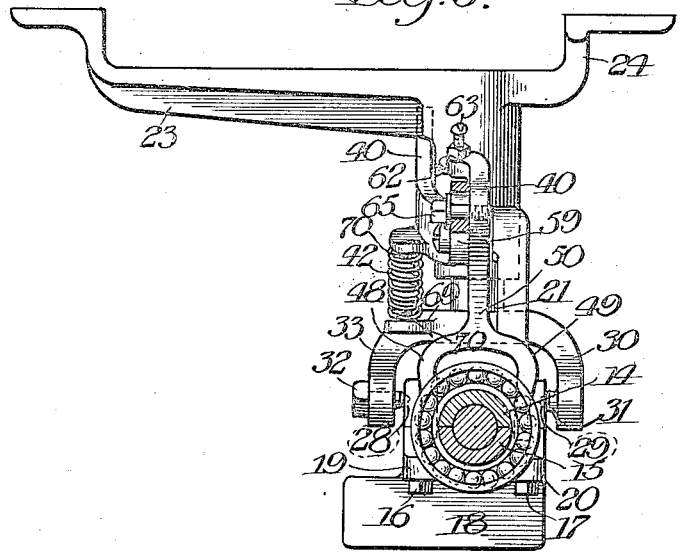
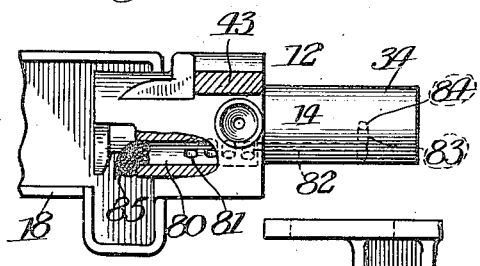
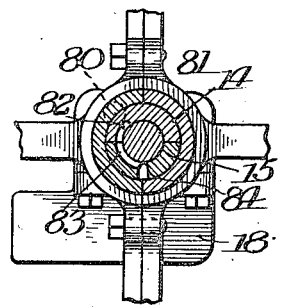
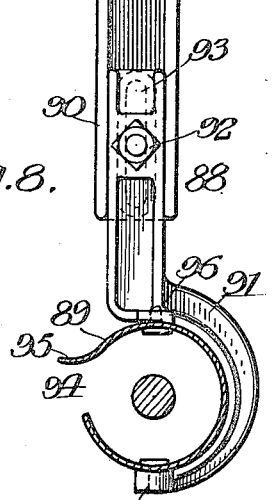

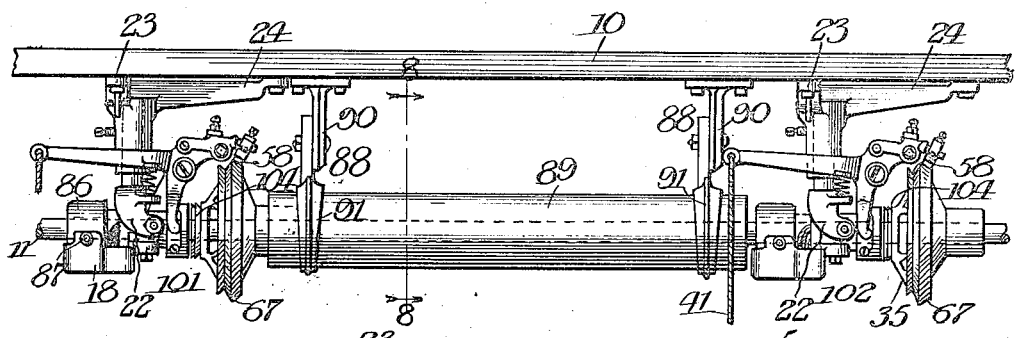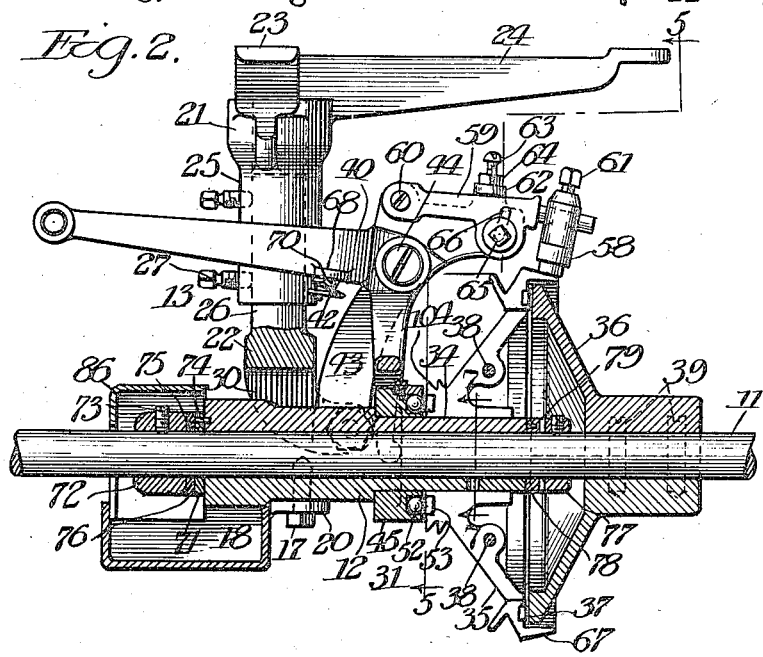

UNITED STATES PATENT OFFICE.

ALBERT KRASA, OF MICHIGAN CITY, INDIANA.

TRANSMISSION FOR SEWING-MACHINES AND THE LIKE.

1,224,473.  Specification of Letters Patent.  Patented May 1, 1917.

Application filed August 18, 1913. Serial No. 785,334.

*To all whom it may concern:*

Be it known that I, ALBERT KRASA, a citizen of the United States, and resident of Michigan City, county of Laporte, and State of Indiana, have invented certain new and useful Improvements in Transmissions for Sewing-Machines and the like, of which the following is a specification, and which are illustrated in the accompanying drawings, forming a part thereof.

The invention relates to power transmitting mechanism and has for its object to provide improved means for transmitting power from a single shaft to a plurality of individual operating units desired to be independently actuated. The invention is exemplified in the mechanism to be hereinafter described and which is illustrated in the accompanying drawings, wherein—

Figure 1 is a front elevation showing details of a table adapted to receive a plurality of independent sewing machines or like devices, and of a line shaft extending longitudinally beneath the table and a plurality of power transmitting elements, one for each of the said devices;

Fig. 2 is a central longitudinal sectional view of one of the power transmitting elements, some of the parts being shown in front elevation;

Fig. 3 is a detail end view of a form of ball bearing collar which may be used in each of the power transmitting elements;

Fig. 4 is a plan view of the said ball bearing collar;

Fig. 5 is a sectional view taken on the line 5—5 of Fig. 2;

Fig. 6 is a detail plan sectional view, some of the parts being broken away and others being omitted;

Fig. 7 is a detail sectional view taken on the line 7—7 of Fig. 2, and

Fig. 8 is a detail sectional view taken on the line 8—8 of Fig. 1.

The apparatus provided by the invention is particularly applicable for use in connection with a plurality of sewing machines or like devices, (not shown) arranged in longitudinal alinement upon a table, as 10. Power for actuating all of the said machines will be derived from a single line shaft, as 11. Preferably this line shaft is extended horizontally beneath the table 10, and is spaced apart but a short distance from the under side of the table.

Separate power transmitting units, as 101 and 102 are provided for operating each of the said sewing machines or like devices mounted upon the table 10. These several units will preferably be of like construction and but one will be described. As shown, each unit includes a journal bearing 12 for the line shaft 11, and a belt pulley 35. A belt (not shown) turning over the belt pulley 35 will extend upwardly through the table 10 for transmitting power to the sewing machine or other device mounted on the table in a manner that will be fully understood.

The journal bearing 12 is desirably supported from the under side of the table 10, as by means of an adjustable hanger generally indicated at 13. In order that the journal bearing 12 may be applied to the line shaft 11, at any desired point without threading it over the end of the shaft, it is shown as being formed in complementary upper and lower sections, 14, 15. These sections are conveniently united by a pair of screw bolts 16, 17, one located at each side of the shaft. If desired, an oil receptacle, 18, may be rigidly secured to the journal bearing 12. As shown, this oil receptacle is held in place by the bolts 16, 17, which also serve for connecting sections 14, 15, of the bearing. To this end the oil receptacle, 18, is provided with apertured lugs 19, 20, one for receiving each of said bolts, 16, 17.

The hanger, 13, is preferably so constructed as to permit both vertical and angular adjustment of the bearing 12. As shown, it is formed from a pair of adjustably connected sections, 21 and 22. The section 21 of the hanger 13 comprises a plurality of integral bracket arms, as 23, 24, each constructed to be secured against the under side of the table 10, and a tubular socket portion 25. The other section 22 of the hanger is shown as having an upright stem 26 adapted to enter the tubular socket member 24, of the section 21, and to be adjustably held therein by clamping screws 27. The lower end portion of the section 22 of the hanger 13, is bifurcated, the two arms, as 30 and 33, so formed being adapted to straddle the upper section 14 of the journal bearing 12. Angular adjustment of the journal bearing 12, is provided by means of a pivotal connection of the bearing with the hanger. As shown, sockets 28 and 29 are located in horizontal alinement at the opposite sides of the upper section 14 of the bearing. One of these sockets, as 29, serves to receive an instanding pivot lug 31, integrally formed upon the arm 30 of the section 22 of the hanger 13, adjacent its lower end. A screw bolt 32, having a tapered inner end extends through the other arm, as 33 of the bifurcated lower end of the section 21 of the hanger for entering the other socket, as 29.

The belt pulley 35 is conveniently mounted upon the journal bearing 12. As shown, a part, as 34, of the bearing is made of cylindrical form to provide for the turning of the pulley thereon. A clutch disk, 36, is fixed upon the line shaft 11 in front of the belt pulley 35, and serves for transmitting power thereto by frictional engagement with the face of the pulley. To this end the pulley 35, is slidingly mounted upon the cylindrical portion 34 of the journal bearing 12, and a ring 37, of leather, or other yielding material, is fixed in that part of the face of the pulley 35, which comes into engagement with the clutch disk, 36. To permit the pulley 35, and the clutch disk 36 to be fitted in place about any part of the shaft 11, each of these members is made in sections and the two sections of each member are removably connected by screw bolts, as 38 and 39. The screw bolts 39 which serve for connecting the sections of the clutch disk 36, also serve for firmly clamping this member in position on the line shaft 11.

A bell crank lever 40, is employed for longitudinally shifting the belt pulley 35 to move it into and out of frictional contact with the clutch disk 36. This bell crank lever will be conveniently moved in one direction by a treadle, (not shown) connected to one arm of the lever, as by a link 41. A spring, 42, serves for moving the bell crank lever 40 in the other direction. To insure a proper engagement between the bell crank lever 40, and the parts which it operates, irrespective of the adjustment of the sections of the hanger 13, and of the angular position of the journal bearing 12, in the hanger, the bell crank lever is pivotally supported upon one of the sections of the journal bearing 12. As shown, a bracket lug 43 is formed integral with the upper section 14 of the journal bearing 12 and carries a pivot bolt 44 upon which the bell crank lever 40 is mounted.

A collar 45, is slidingly mounted upon the cylindrical portion 34 of the journal bearing 12 adjacent the hub of the pulley 35 to transmit motion in one direction from the bell crank lever 40, to the pulley. This collar is preferably fixed against rotation. As shown, the sides, as 46 and 47, of the collar are flattened for a portion of their length to receive the arms as 48 and 49 of a bifurcated end 50, of the lever 40, between them, and to provide shoulders 103, 104, against which the said arms may abut for shifting the collar.

The collar, 45, preferably has a ball bearing engagement with the hub of the pulley 35. As shown, the face of the collar which is adjacent the hub of the pulley is provided with an annular groove 51 for receiving a series of balls 52 and the adjacent end of the hub of the pulley 35, is shod with a ring 53 of hardened steel for engagement with the said balls. Displacement of the balls 52 in assembling or disassembling the parts of the mechanism is conveniently prevented by undercutting the groove 51 and by making the balls 52 larger in diameter than the width of the groove at its mouth. When so formed, a lateral opening 54 is provided in the ring 45 for inserting the balls 52 into the groove or removing them therefrom. A cover plate 55, fits over the opening 54 and is removably held in place by a set screw 56, for retaining the balls within the groove. The ring 45, like the pulley 35 and clutch disk 36 is conveniently formed in sections to permit it to be fitted about the shaft 11 without threading it over the end of the shaft. As shown, these sections are detachably connected by a pair of screw bolts 57, one located adjacent each side of the ring.

A brake, 58, acts upon the rim of the pulley 35, when the bell crank 40 is released to shift the pulley out of engagement with the face of the clutch disk 36 and arrest its rotation. This brake is shown as being adjustably mounted upon the bell crank lever 40. To this end, an arm 59 is pivotally attached to the bell crank lever 40, as at 60, Fig. 2. The brake 58, is adjustably secured upon the outer end of this arm by a clamping screw 61. A lug, 62, projects laterally from the bell crank lever 40 above the arm 59. A set screw 63 threaded through the lug 62 and carrying a lock nut 64 bears upon the top of the arm 59 for adjusting the arm about the pivot 60. A clamping bolt 65, threaded into the lever 40 and extending through a slotted aperture 66, in the arm 59, serves for holding the arm 59 in angularly adjusted position. In order that the action of the brake 58 upon the rim of the pulley 35 may serve to move the pulley out of engagement with the clutch disk 36, that part of the rim of the pulley which is engaged by the brake is beveled, as indicated at 67, Fig. 2. The spring 42 reacts between a bracket lug 68, formed on the bell crank lever 40 and a lug 69 formed on the arm 33 of the bifurcated lower end of the section 21 of the hanger 13. Preferably each of the bracket lugs 68 and 69 is provided with a stud 70 which fits within the corresponding end of the spring to prevent its displacement.

In order that the pressure exerted against the clutch disk 36 may be received upon the journal bearing 12, a thrust bearing is provided between the line shaft 11, and that end of the journal bearing 12, which is remote from the disk. As shown, a hardened ring 71, is fitted against the end of the journal bearing 12, and a collar 72 is firmly clamped upon the shaft 11 in front of this ring. The collar 72 is conveniently clamped upon the shaft by the use of a plurality of set screws, one of which appears at 73. Most desirably the ring 71 is held against turning by means of a pin 74 which projects from the adjacent end of the journal bearing 12, and enters a socket 75 in the ring. Friction between the ring 71 and the collar 73 is reduced by interposing a fiber ring 76 between these parts.

In some instances it may be desirable to fix a collar 77 upon the line shaft 11 in front of that end of the journal bearing 12 which is adjacent the clutch disk 36. The collar 77 is only required to prevent longitudinal displacement of the line shaft 11 and will usually be associated with only a small number of the transmitting devices in use, as for example those located at the opposite ends of the table 10. When the collar 77 is employed, a hardened ring 78, similar to the ring 71 and held against rotation in a similar manner will be fitted against the adjacent end of the journal bearing 12. A fiber ring 79 is then desirably inserted between the collar 77 and hardened ring 78, to reduce the friction and wear incident to the engagement of these parts.

If desired, lubrication for both the shaft 11 and pulley 35 may be derived from the oil container 18. As shown, a wick socket 80 extends longitudinally into the upper section 14 of the journal bearing 12 from that end of the same which is above the oil container 18. Openings 81 lead radially into the bearing from this socket. These openings serve for conveying oil to the shaft 11. For conveying oil to the pulley 35, a groove 82 extends longitudinally upon the inner surface of the journal bearing 12 from the inner ends of the openings 81 toward the pulley. A second groove, 83, circumferentially formed upon the inner face of the journal bearing 12 and communicating with the end of the groove 82 extends to the under side of the bearing. At this point, an opening 84, leads from the circumferential groove 83 through the wall of the bearing to the interior of the hub of the pulley 35. If now, a wick, as 85, which dips into the container 18, be thrust into the wick socket 80, oil fed by this wick will be delivered to the shaft 11 and to the hub of the pulley 35. Usually a shield, as 86, will be used for covering the collar 72 and rings 71 and 76. As shown, this shield is removably secured to the walls of the container 18, as by a set screw 87, and extends over the collar 72 and rings 71 and 76. It serves both for collecting oil which may be projected from the collar 72 by centrifugal force and also as a guard for protecting the clothing of the workers from contact with the collar. A guard to prevent lint or threads from finding their way into the ball bearing 52 and becoming entangled therein is provided upon the hub of the pulley 35 and preferably consists of a pair of conical rings 104 integral with the hub. The faces of these rings incline away from the balls so as to carry threads and the like, which fall upon the rings, away from said balls.

The location of the shaft 11, near the underside of the table 10, makes it desirable that the parts of this shaft which extend between the several power transmitting units, as 101, 102, should also be covered with a guard. To this end brackets, generally designated as 88, are secured to the underside of the table 10, at suitable intervals for supporting a tubular shield 89. To enable the shield to be alined with the shaft each bracket 88 is made adjustable. As shown, each backet 88 is formed in two parts 90 and 91, and these parts are connected by a clamping bolt 92 which passes through a vertically slotted opening 93 in one of said parts. The shield 89 is conveniently formed of sheet metal bent to tubular form but having the edges of the sheet separated to provide a slot 94, extending along one side of the shield from end to end to permit of the shield being fitted over the shaft. Preferably, one edge of the sheet is turned outwardly to form an overhanging lip 95. This lip serves to prevent articles which may fall upon the shield from entering the interior of the shield through the slotted opening 94. The part 91 of each of the brackets 88 is suitably formed at its lower end to extend partially around the shield and the shield is permanently secured to this part of the bracket, as by rivets 96, 97.

The invention renders it unnecessary to provide separate countershafts for each machine to be driven and the use of more than one belt at each of such machines is avoided. Furthermore the single belt which is required is driven only when it is desired to operate the particular machine to which it pertains. The mechanism illustrated is of compact arrangement, is conveniently assembled and none of its parts except the clutch disk 36, is required to be rotated except when power is to be transmitted. As the belt pulley 35 turns upon a stationary spindle, no power is consumed by the turning of the spindle within the pulley when the latter is idle.

I claim as my invention,—

The combination with a work table and a power shaft extending longitudinally under the table, of a plurality of independent bracket members rigidly secured against the under side of the table at intervals along the same, a second bracket member adjustably secured to each of the first named bracket members for both angular and longitudinal adjustment upon a vertical axis, a series of journal bearings for the shaft each pivotally mounted in one of the second mentioned bracket members for angular adjustment in a vertical plane to the alinement of the shaft, a pulley having an outwardly facing clutch engaging face turning upon the exterior of each of the said journal bearings adjacent one end of the same, a clutch plate fixed against rotation on the shaft adjacent the said end of each of the said journal bearings and forming, with the corresponding pulley, a coöperating pair of clutch members, one of each of the said pairs of clutch members being axially movable, and a separate controlling lever for moving each of the movable clutch members.

ALBERT KRASA.

Witnesses:
CHARLES B. GILLSON,
RUTH RINGLE.